United States Patent [19]
Towers et al.

[11] Patent Number: 5,692,106
[45] Date of Patent: Nov. 25, 1997

[54] SYSTEM MANAGEMENT METHOD AND APPARATUS

[75] Inventors: Simon J. Towers, Bath; Paul V. Mellor, Bristol, both of England

[73] Assignee: Hewlett-Packard Company, Palo Alto, Calif.

[21] Appl. No.: 244,664

[22] PCT Filed: Oct. 12, 1993

[86] PCT No.: PCT/GB93/02106

§ 371 Date: Jun. 6, 1994

§ 102(e) Date: Jun. 6, 1994

[87] PCT Pub. No.: WO94/09427

PCT Pub. Date: Apr. 28, 1994

[30] Foreign Application Priority Data

Oct. 13, 1992 [WO] WIPO .................. PCT/GB92/01875

[51] Int. Cl.$^6$ .................................................. G06F 17/00
[52] U.S. Cl. .................... 395/50; 395/54; 395/75
[58] Field of Search ....................... 395/50, 51, 53, 395/54, 60, 75

[56] References Cited

FOREIGN PATENT DOCUMENTS

| AO 442 809 | 8/1991 | European Pat. Off. ........ G06F 11/27 |
| 0 473 255 A2 | 3/1992 | European Pat. Off. . |
| WO 92/05485 | 4/1992 | WIPO . |

OTHER PUBLICATIONS

"ANM: Automated Network Management System", by M. Feridun, et al, IEEE Network, vol. 2, No. 2, Mar. 1988, pp. 13–19.

"Ein Modulares, Verteiltes Diagnose–Expertensystem Fur Die Fehlerdiagnose in Lokalen Netzen", by Jurgen M. Schroder, Automatisierungstechnische Praxis—ATP, vol. 32, No. 11, Nov. 1990, pp. 557–565.

(List continued on next page.)

*Primary Examiner*—Tariq R. Hafiz

[57] ABSTRACT

To facilitate the carrying out of a range of different types of management task in a computer system (such as fault diagnosis and service installation), declarative models (22) are constructed of the various services provided by the system (10–13). These models (22) specify the requirements that need to be met for the corresponding service to be available. These requirements are set out in terms of the system entities that need to be present and the inter-relationships of these entities. In addition, each management task is specified in a corresponding task program (21) in terms of general inferencing operations that can be performed on any of the models. Execution of a particular management task involves carrying out inferencing operations on the appropriate service model (22) in accordance with the task program (21) for the management task under consideration.

19 Claims, 9 Drawing Sheets

OTHER PUBLICATIONS

"Starkeeper Network Troubleshouter: An Expert System Product", by Todd E. Marques, AT & T Technical Journal, Nov. 1988, pp. 137–154.

Chen, Jiann–Liang and Ronlon Tsai, "The Manager's Consultant: An Intelligent Framework for Network Management." Developing and Managing Expert System Programs 1991.

Rabie, Sameh, "Integrated Network Management: Technologies and Implementation Experience" INFOCOM 1992.

Padovano, Michael. "WizDom lends a hand with system administration," Systems Integration. Apr. 1992 v.25 n.4 p. 17(1).

Samadi, Behrokh, "TUNEX:A Knowledge–Based System for Performance Tuning of the UNIX Operating System." IEEE Transactions of Software Engineering. Jul. 1989 v.15 n.7.

Kim, M.W. et al., "An Advanced Service Application for Private Intelligent Secretary Service," *International Switching Symposium*, Poster Session Paper #6, vol. 3, May 1990, Stockholm, Sweden, pp. 33–36.

Ng, P–T.P., "Supporting Service Development for Intelligent Networks," *IEEE Journal on Selected Areas in Communications*, vol. 8, No. 2, Feb. 1990, New York, pp. 189–195.

William, R., "Technologies and Applications," *Proceedings of the National Communications Forum*, vol. 42, No. 2. Sep. 1988, Oak Brook, Illinois, pp. 957–969.

Goyal, S.K. et al., "Expert Systems in Network Maintenance and Management," *IEEE International Conference on Communications* 86, Jun. 22, 1986, Toronto, Ontario, Canada, pp. 1225–1229.

Fujimoto, K. et al., "Intelligent Network Operations Systems for INS Network," *IEEE International Conference on Communications* 88, Jun. 12, 1988, Philadelphia, PA, pp. 1768–1772.

Kondo, Y. et al., "Hierarchical Service Control Scheme for Intellignet Network Services," *Electronics and Communications in Japan*, vol. 74, No. 4, Apr. 1991, New York, NY, pp. 1–11.

Ljungblom, F., "A Service Management System for the Intelligent Network," *Ericsson Review*, vol. 67, No. 1, 1990, Stockholm, Sweden, pp. 32–41.

S1 = can Print [ file ] on [ ptrName ]
S2 = can Find[ pSSserver ] Addr
S3 = has Route To [ pSServer ]
S4 = print [ file ] on [ ptrName ] from [ hostName ]
S5 = has Route To [ printer ]
S6 = print [ psFile ]

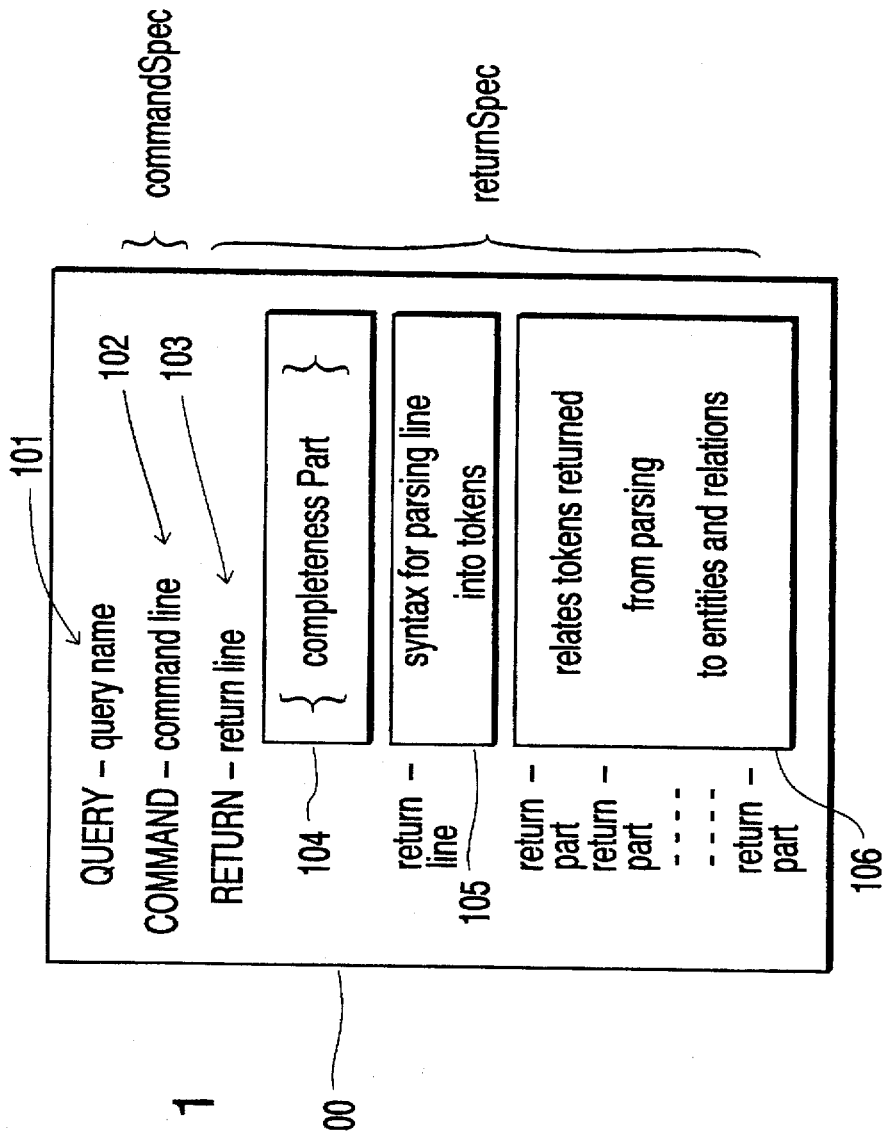

SYSTEM MANAGEMENT METHOD AND APPARATUS

FIELD OF THE INVENTION

The present invention relates to a system management method and apparatus for carrying out at least one management task in relation to at least one service intended to be provided by a computer system. In particular, but not exclusively, the present invention relates to a method and apparatus for facilitating the carrying out of a number of management tasks (such as installation, monitoring, and fault diagnosis) in relation to a number of different services (such as log-on, electronic mail, and print spooling) provided on a network of computers.

BACKGROUND ART

Over recent years the complexity of computer systems (and in particular, computer networks) has increased considerably, such systems being characterised by the interaction of multiple system entities in providing a variety of different services. One result of this is to have placed a considerable strain on system management resources tasked to keep such systems up and running. Whilst low-level fault-diagnosis equipment such as protocol analyzers have evolved generally in line with the increasing sophistication of the technologies used for inter-linking system entities, such equipment has often tended only to serve as an aid to a maintenance engineer, telling him/her what is wrong at the particular point under test. Similarly, higher-level network management systems that seek to provide an overview of overall system performance by collecting data from all parts of a network, have largely been of limited use leaving much of the problem of understanding what is going on to the network supervisor.

More recently, a number of proposals have been made to introduce expert system technology to network fault diagnosis and management. One network management system using such technology is the ANM (Automated Network Management) system described in the article "ANM: Automated Network Management System" by Feridun, M Leib, M Nodine and J Ong, IEEE Network, March 1988—Vol 2, No 2. In the ANM system, network entities such as gateways, provide data to a backbone of Distributed Management Modules (DMMs) which service 'Clients' that provide the network management services. Clients request and receive raw data collected from network entities by the DMM backbone; Clients can also request the DMM backbone to execute specific actions. A specialised Client called an Intelligent Network Manager is provided and comprises a collection of expert systems (Experts) organised as a top-level Expert which forwards triggering data received from the network entities to other Experts that each understand a specific kind of network problem. These Experts, in turn, may suggest possible hypotheses that might explain the triggering data. If necessary, each Expert may request additional data from network entities. When Experts suggest, confirm or reject hypotheses, the network operator is informed. To add expertise about a new type of network problem, to the Intelligent Network Manager of ANM, a new Expert must be added to the system, and to change the way the system reasons about problems, all Experts conducting such reasoning must be changed.

Another example of the use of expert system technology in the field is the network monitoring and analysis apparatus described in European Patent Application 0 473 255 A2 (Hewlett-Packard). This apparatus is also provided with a number of different expert systems (Consultants); however, unlike the ANM system in which the Experts are concerned with respective types of network problem, in the Hewlett-Pochard apparatus each Consultant is concerned with a respective one of the types of operations normally involved in the analysis of any given network problem.

In both these latter arrangements, expert knowledge is encoded in expert systems with the object of identifying network faults given a set of symptoms and suggesting possible solutions. Any knowledge about what should be happening on the system is closely bound to the problem to be solved. As a result, the expert knowledge is not available for use in other types of management task where no fault exists, such as installation of a service. This trait is characteristic of today's systems that seek to provide assistance in the carrying out of network management tasks and one consequence of this has been that each management task tends to have its own special aids (generally in the form of software tools) the number of which for each task corresponds to the number of network services in respect of which the task is to be effected.

It is an object of the present invention to facilitate system management by providing expert knowledge about the system in a more useful form.

DISCLOSURE OF THE INVENTION

In general terms, the present invention achieves this object by specifying the requirements needed for a particular service to be available in the form of a declarative model and then defining management tasks in terms of general inferencing operations that can be carried out on such models. As a consequence, each service model can be used by each task.

As used herein, the term "declarative model" refers to an abstract description of a service, the meaning of the model being independent of any form of processing to which the model may be subject; a model thus has no notion of sequence, iteration or choice in relation to how it is to be used (in contrast to what is typically the case with imperative models) and, instead, the model employs logical operators (such as AND, OR ,NOT) and recursion as appropriate. Of course, concepts of sequence, iteration and choice may well be represented in the model as part of the modelling of the service concerned but this does not affect the declarative nature of the model.

It should be noted that the type of model here referred to is fundamentally different from that disclosed in International Application WO 92/05485 (Cabletron Systems) where a 'virtual network' simulating a real network being managed, is built up from 'models' of each entity in the real network. Neither the 'virtual network' nor the individual 'models' of the Cabletron system seek to describe a network services as is the case in the present invention; furthermore, the Cabletron 'models' have a one-to-one correspondence with real world items which again differs from the present invention where a single service model defines the requirements of a service regardless of whether there are none, one or many actual instances of the service in the real system.

More formally stated, according to one aspect of the present invention, there is provided a system management method for carrying out at least one management task in relation to at least one service intended to be provided by a computer system made up of cooperating physical and logical entities, the method comprising the steps of:

providing for the or each said at least one service, a respective declarative model specifying independently of any particular said task, the requirements needing to be met for the service to be available, these requirements being set out in terms of the entities required and their inter-relationships, providing for the or each said at least one management task, respective task control means for controlling performance of the corresponding task in a manner independent of any particular said model and in terms of general inferencing operations that can be performed on any said model, and performing a said at least one management task in relation to a said at least one service by a process involving effecting inferencing operations on the corresponding declarative model under the control of the said task control means relevant to that management task.

Preferably, each said task control means comprises a respective task program for controlling the operation of an inference engine to perform the corresponding task, the same engine being used for each task regardless of the model to be processed. However, it is also possible to arrange for a said task control means to be embodied in the functional architecture of an inference engine thereby specifically adapting that engine for the corresponding task; in this case, there will be a respective inference engine for each task to be performed. An intermediate approach is also possible where the functional architecture of a common inference engine is determined by the task to be performed but, in addition, there is a task program exercising this functionality in a programmed manner; this approach is feasible due to the fact that inference engines are generally implemented by software routines on standard hardware so that the functionality of the inference engine can be changed by altering the inter-relationship of its component routines.

The system management method of the invention is particularly advantageous where there are multiple services and multiple tasks to be performed as it avoids the need to write special programs to carry out each pairing of service and task. However, the method is also applicable where there is only one service provided or only one task to be performed.

Generally, the computer system to be managed (typically a computer network) will be capable of supporting a plurality of instantiations of a service, the step of carrying out a management task in relation to that service involving identifying an instantiation of the service and then using the appropriate service model to inference information in relation to the identified service instantiation.

Advantageously, the declarative model of a service comprises a hierarchical structure of declarative statements inter-relating entities, statements lower in the hierarchy serving to detail requirements specified by statements higher in said hierarchy.

These statements may include, in addition to statements directly specifying requirements, statements generally inter-relating entities and usable to infer whether a particular requirement has been met. Where appropriate, a model can be associated with another such that statements set out in one model and involving a particular entity, are usable in the other model in connection with the same entity.

The requirements specified in a service model can advantageously be divided into sets, namely a set of essential technical requirements and a further set of operating policy requirements setting out, for example, names to be used for particular files.

Advantageously, to facilitate the carrying out of a management task, information on the system is made available through reference to a fact base which can be updated through interaction with the system to provide desired information (in this latter case, the desired information is ascertained either directly through queries designed to elicit specific items of information, or indirectly by inferencing from the results of a particular system function exercised by the interaction).

The system management method is applicable not only to tasks where the computer system is left unaltered by the task (for example, a fault diagnosis task), but also to tasks (such as installation of a service for a particular user) that require the system to be changed in some manner (by adding or removing an entity or by modifying the inter-relationship between at least two entities).

According to another aspect of the present invention, there is provided system management apparatus for carrying out at least one management task in relation to at least one service intended to be provided by a computer system made up of cooperating physical and logical entities, the apparatus comprising:

for the or each said at least one service, a declarative model specifying independently of any particular task, the requirements needing to be met for the service to be available, these requirements being set out in terms of the entities required and their inter-relationships, inference engine means for carrying out inferencing operations in relation to a said declarative model, for the or each said at least one management task, respective task control means for controlling performance of the corresponding task by said inference engine means in a manner independent of any particular service model and in terms of general inferencing operations, and means for causing a management task to be carried out in relation to a particular service by causing said inference engine means to operate on the corresponding declarative model under the control of the task control means relevant to that management task.

Preferably, the system management apparatus further comprises fact base means for storing facts about the system, and interaction means for interacting with the system to ascertain either directly or through inferencing from the results of the interaction, facts about the system, the inference engine means being operative in the course of carrying out a said management task to check whether a said requirement is being met by the system by referring to the fact base means and in the event that insufficient facts are present in the fact base means, by causing the interaction means to interact with the system to elicit further facts.

BRIEF DESCRIPTION OF THE DRAWINGS

System management apparatus embodying the present invention will now be described, by way of non-limiting example with reference to the accompanying diagrammatic drawings, in which:

FIG. 11 is a diagram illustrating the format of a query usable to obtain information from the computer system being managed; and FIG. 12 is a drawing of syntactic parsing of a return string giving information about a user of the computer system being managed.

BEST MODE FOR CARRYING OUT THE INVENTION

OVERVIEW

Figure 1:
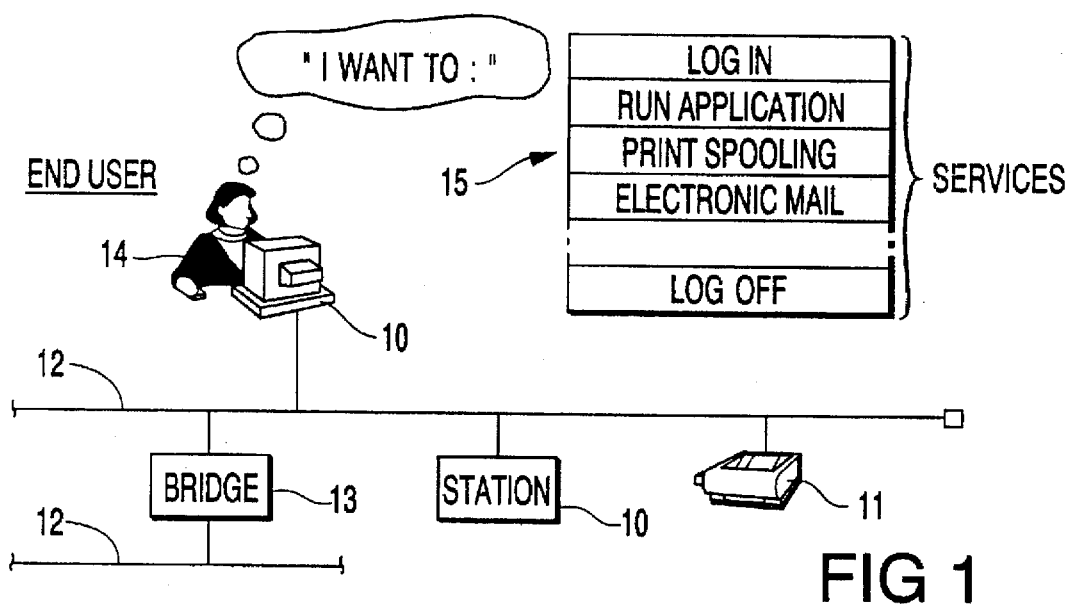
FIG. 1 is a depiction of a computer system as seen from the perspective of an end user.

FIG. 1 is an illustration of a computer system comprising work stations 10 and peripheral devices 11 (for example, printers) inter-connected via a network including LAN segments 12 linked via bridges 13. FIG. 1 is a depiction of an end-user's view of the system. An end-user 14 working at a work station 10 wants the system to provide her/him with one or more services 15 such as logging into the computer system, running a particular application program, print spooling, electronic mail, and log off.

Figure 2:
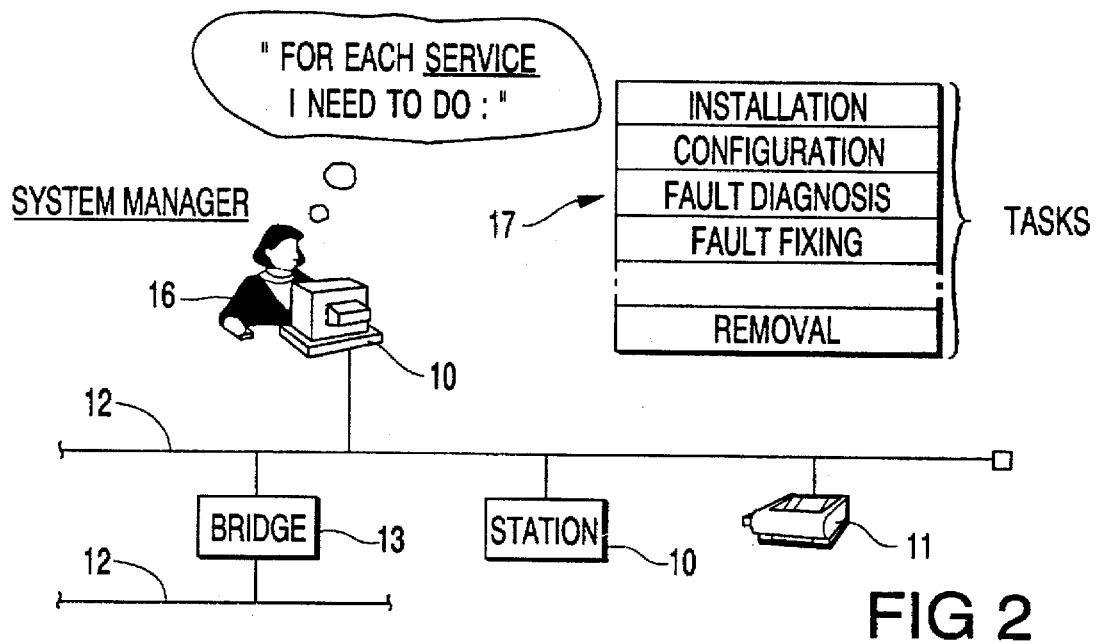
FIG. 2 is a depiction of a computer system as seen from the perspective of a system manager.

FIG. 2 is a depiction of for the same computer system as FIG. 1 a the view of the system taken by a system manager 16 also working at a work station 10 of the system. For each service available to an end user on the system, the system manager 16 must be ready to carry out a number of tasks 17 including installation of the service, configuration of the service, fault diagnosis, fault fixing and removal of the service. To this end, the system manager's work station runs appropriate software that turns the work station into a management system for carrying out each task in relation to each service. In prior art systems, this management system has required the writing of specific programs for each pairing of service and task. The management system to be described hereinafter and which embodies the present invention obviates this need and requires only the characterisation of each task and of each service separately.

Figure 3:
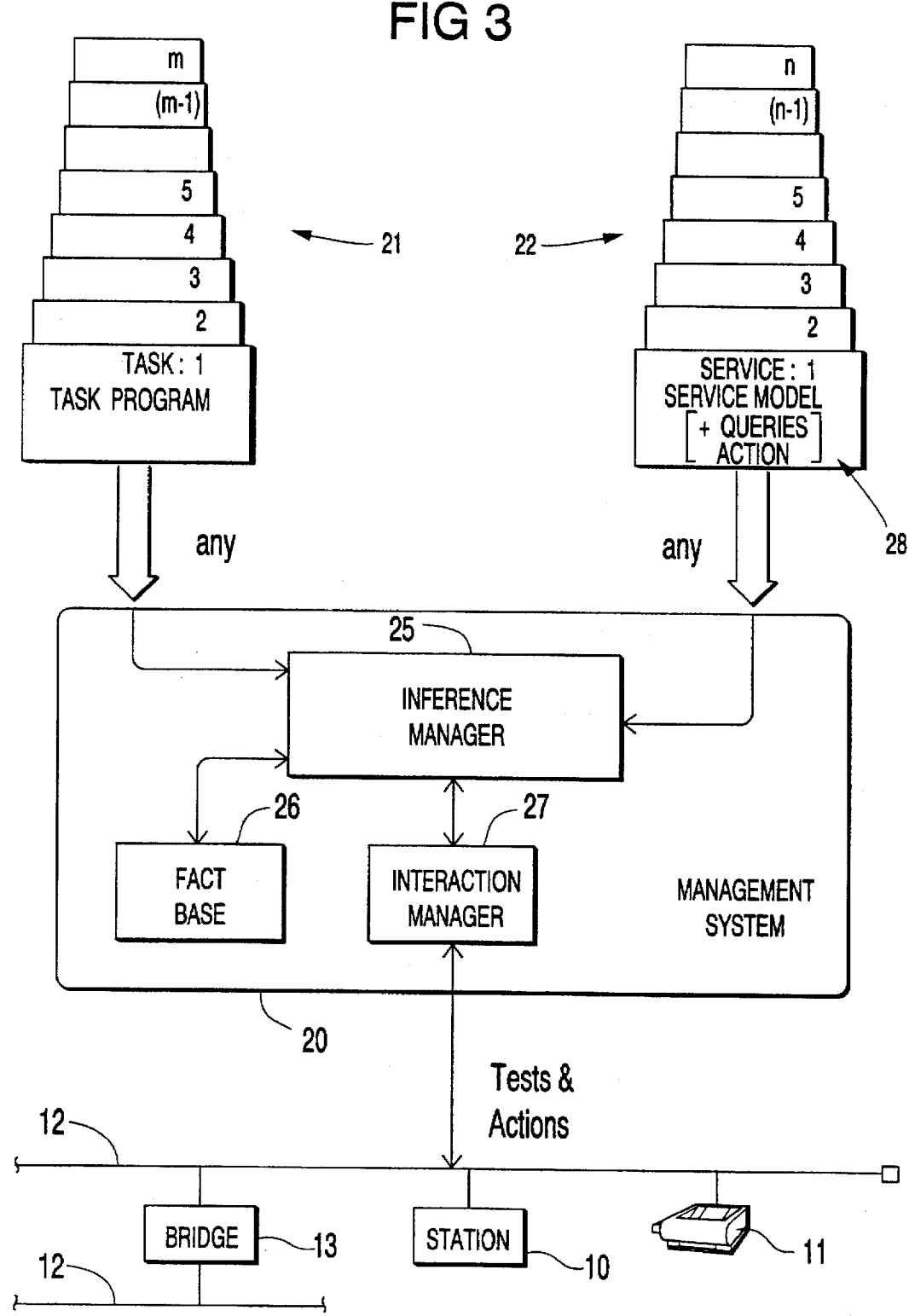
FIG. 3 is an overview diagram of the system management apparatus embodying the invention showing the any-to-any pairing of task programs and service models.

The general form of the system management apparatus embodied in the present invention is shown in FIG. 3. The main components of the apparatus are a set of task programs 21 (one for each of the m tasks to be performed), a set of service models 22 (one for each of n services provided by the computer system), and a management system 20 constituted by work station 10 of the computer system and appropriate software.

Each service model 22 is a declarative model of the service concerned and specifies the requirements needing to be met for the service to be available. These requirements are set out in terms of relationships between the physical and logical entities of the computer system. A service model contains no information about how it is to be used for different management tasks. Associated with each service model are queries and actions 28. Queries detail how information regarding the requirements specified for the service concerned may be obtained by inter-action with the computer system. Actions detail how to initiate the carrying out of procedures relevant to the modelled service that may be required to implement certain tasks.

The management system 20 comprises an inference engine 25, a fact base 26 and an inter-action manager 27. When carrying out any particular task under the control of one of the task programs 21, the inference engine 25 uses the service model for the service in respect of which the task is being carried out, to identify the requirements for the service and then uses whatever information might be available to it, to make certain inferences from these requirements (in particular, whether they have been met or need to be met). The fact base 26 stores facts already known to the management system and which are therefore directly available to the inferencing engine 25. If desired facts are not in the fact base 26, the inference engine 25 is operative to use the queries associated with the relevant service model 22 to cause the inter-action manager 27 to interact with the computer system with a view to obtaining the facts concerned directly or indirectly through experience. Furthermore, if it is necessary to modify the system being managed in order to complete a task (for example, installation or removal of a service), the inference engine is operative to cause appropriate predefined actions associated with the relevant service model 22 to be initiated via the interactions manager 27.

By way of illustration and using a pseudo natural language, a login service model in respect of a user login service may specify that the service is available to an intending user if four requirements are met:

Login service is ok for intending user called Name, IF:

the system has a record of a user by this Name, and this user has a password, and this user has a home directory, and this user has execute access to that directory.

If now it is wished to carry out diagnosis of the login service for a particular user, a diagnosis task program causes the inference engine 25 to examine the login service model and identity all the requirements that must be met. For example, if a user called "John" cannot login, then the model states that the system must know about a user with that name, that he must have a password, that he must have a home directory, that he must have execute access to that directory; the inference engine 25 proceeds under the control of the diagnosis task program to ascertain which of these requirements has not been met.

Should it be desired to add a new user to the system, an "add-user" task program causes the inference engine 25 to examine the login service model to identify what requirements must be met for the new user to be able to login; these requirements can then be met by appropriate actions on the system.

The task programs, service models, queries and actions will all generally be written in a high-level language and compiled to object code for execution.

INFERENCE ENGINE

Figure 4:
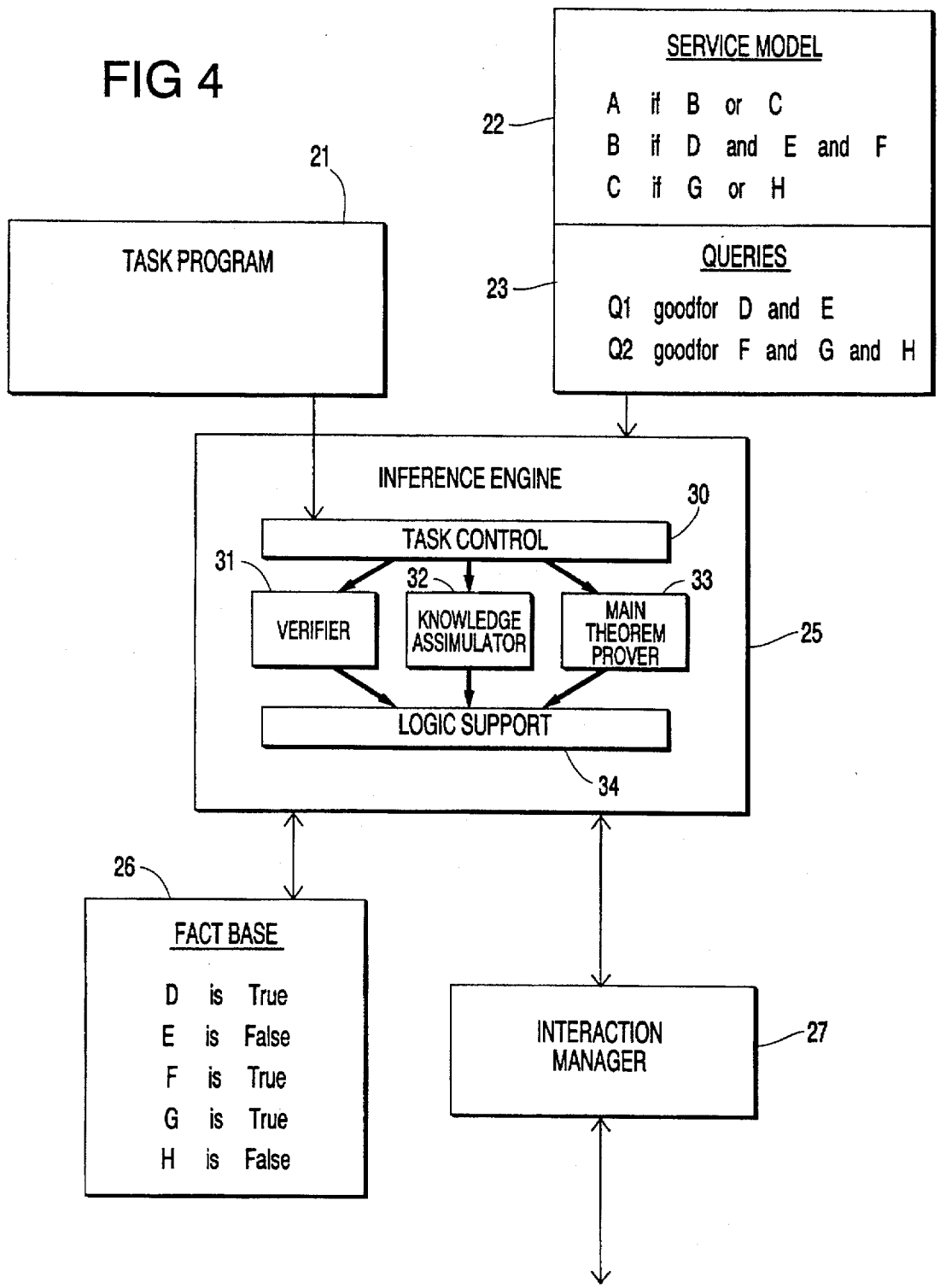
FIG. 4 is a diagram of an inference engine of the FIG. 3 apparatus.

The general form of the inference engine 25 is illustrated in FIG. 4. Conceptually, the inference engine comprises a task control layer 30 for controlling the inference engine in accordance with the task program 21 supplied to it; a proof system made up of a verifier 31, a knowledge assimilator 32 and a theorem prover 33; and a logic support layer (providing for unification, predicates and variables) provided by an appropriate language such as Prolog or Smalltalk both of which are well known to persons skilled in the art.

With regard to the proof system, the verifier 31 uses a closed world deduction system for which if something cannot be proved true it is assumed to be false; the verifier does not utilise queries. The verifier 31 is thus useful for discovering what can be true given the current state of knowledge. The knowledge assimilator 32 uses a form of abduction in order to find consistent extensions to the fact base that are sufficient to explain observations arising from the results of queries. The main theorem prover 33 is an open world deduction system that also considers queries; it is the core of the inference engine. The role of the task control 30 is to integrate the operation of the elements of the proof system in a manner to produce the results desired for the task being effected; generally, however, it may be said that if the theorem prover 33 is unable to prove a particular theorem on the basis of facts currently available in the fact base, it will ask the verifier 31 to look at the queries to find one which will provide it with the facts desired, and then once its query has been performed, the knowledge assimilator will extract as much information as possible from the results of the query and store this new information in the fact base for use by the theorem prover 33.

A simple example of how the theorem prover 33 carries out reasoning on the basis of the rules given it in a service model 22 and having regard to facts available in the fact base 26, will now be given.

Each service model contains statements relating to the entity or entities relevant to that model and these statements will generally be used to form a number of rules (conditional relationships) specifying, for example, that a service entity is available if certain conditions are met. Thus with reference to the service model 22 of FIG. 4, there may be truth valued statements A–H in the service model organized into three rules:

A if B or C

B if D and E and F

C if G or H

Statement A may represent that the service concerned is available if statement B or statement C is true. The second rule given above then sets out the conditions to be fulfilled for statement B to be true whilst the third rule gives the conditions for statement C to be true.

Figure 5:
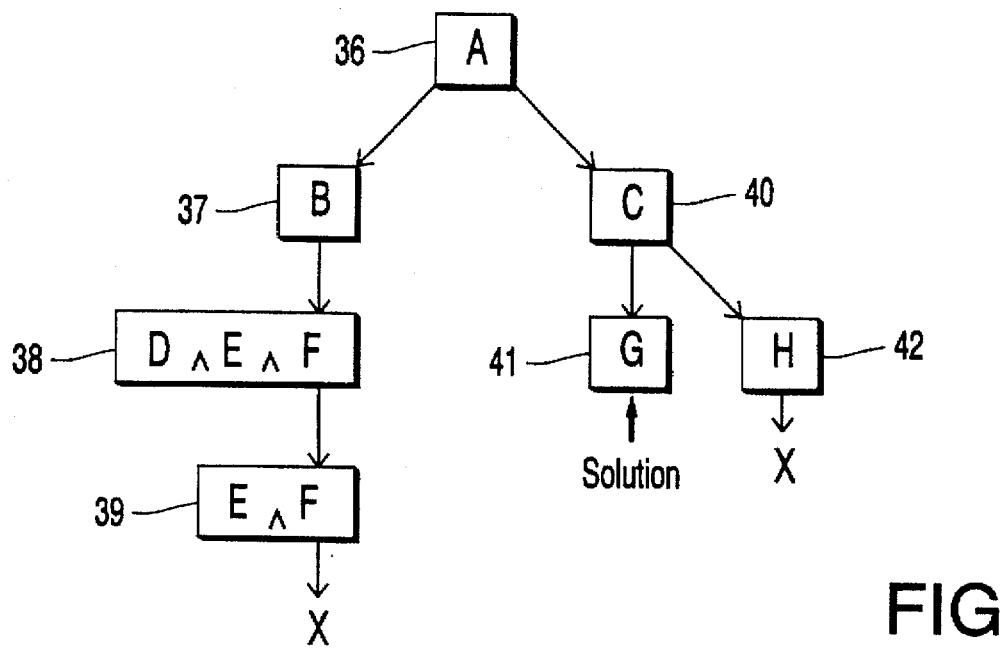
FIG. 5 is a search tree illustrating operation of the FIG. 4 inference engine in respect of an example service model, when given a set of predetermined facts.

By way of example, consider first the situation that the fact base contains the facts that D, F and G are true but E and H are false. Working with the above rules and these facts, the main theorem prover 33 can now deduce whether or not the service represented by model 22 is available—that is, whether A is true. This prove proceeds as follows (See FIG. 5):

(1) Since there is no fact for A but there is a rule, the search for a solution expands into two partial solution nodes.

(2) Now consider B. Again there is no fact, but there is a relevant rule so the search is again expanded.

(3) Now consider D,E,F. There is a fact for D, so the next partial solution is node E,F.

(4) Now consider E,F,E is known to be false, so this branch fails.

(5) Backtracking to the next un-expanded partial solution node (that is, C), there is no fact for C, but there is a rule, so the search is expanded.

(6) Now consider G. This is known to be true, so a solution has been found.

Note, this example is just a simple depth-first search over the solution space. Other search strategies are, of course, also possible such as a "best first" strategy.

Figure 6:
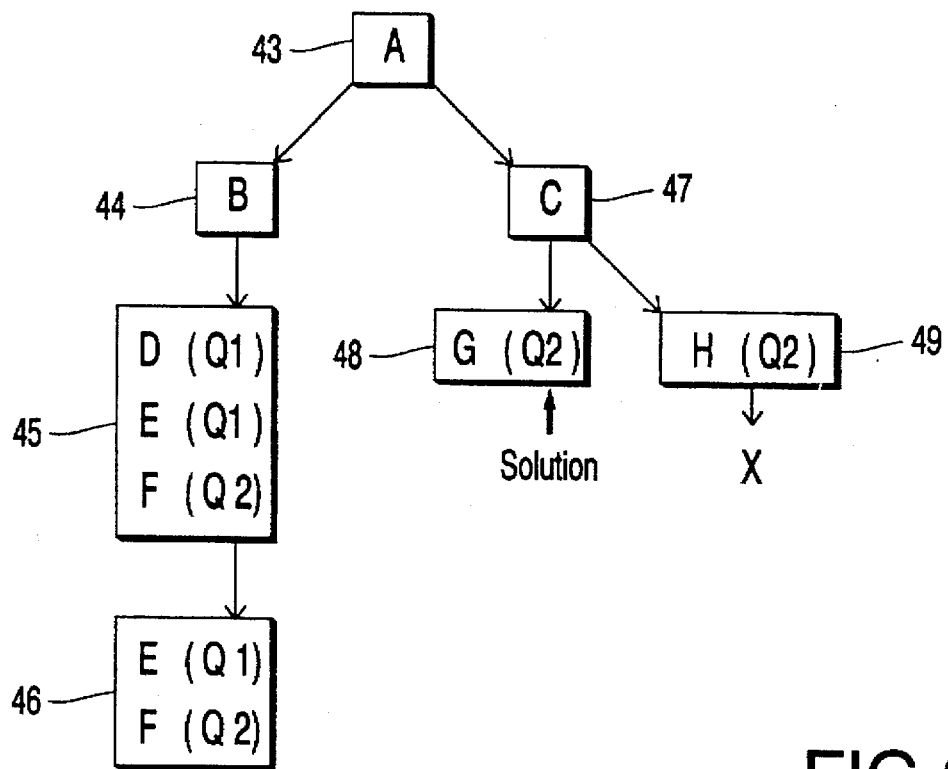
FIG. 6 is a search tree illustrating operation of the FIG. 4 inference engine in respect of the same service model as for FIG. 5, but where queries are used to elicit facts.

Consider next the situation where there are no facts in the fact base 26. However, a set of queries is associated with the model 22 providing two queries Q1 and Q2; query Q1 is 'goodfor' (that is, will give the value of) D and E and Q2 is 'goodfor' F,G and H. In this case, the proof proceeds as follows (see FIG. 6):

(1) The proof of A begins as before until the partial solution node D,E,F is reached. This time there is no fact for D but there is a query Q1. So, query Q1 is executed and this puts the facts 'D is true' and 'F is false' into the fact base, enabling the next partial solution node to be created.

(2) Now consider E,F. There is now a fact for E in the fact base; this fact (E is false) causes this branch to fail.

(3) Backtracking to the next un-expanded partial solution node (that is, C) the search is continued as before.

(4) When G is considered, there is no fact for it, but there is a query Q2. When this is executed the facts 'F is true', 'G is true' and 'H is false' are added to the fact base which results in a solution.

The selection of the appropriate query and the extraction of information from the result of a query involve the verifier 31 and knowledge assimilator 32.

Of course, the foregoing examples are very simple but serve to illustrate the general operation of the inference engine 25 in relation to the models 22, queries 23 and fact base 25.

SERVICE MODELS

A service model specifies a service provided by the system in terms of system entities associated with the service and the relations between these entities.

Entities are items about which facts can be asserted and may correspond to logical objects such as integers, files, operating modes, etc or to real-world physical objects such as machines, printers etc. A number of primitive or core entity types are conveniently pre-defined such as integers, characters and strings and are implicitly available for use in any service model. Higher level entity types are then defined in an appropriate service model with the characteristics of each such entity type being specified in terms of relations between core entities and/or previously-defined higher-level entities. Each entity type and its associated characterising relations are herein generally referred to as an Entity-Relations group (or 'ER group' for short).

Relations may be basic, unconditional, relations between entities or derived, conditional, relations that are only true if one or more conditions are satisfied (these conditions being themselves specified in terms of relations between entities). A relation identifies at least one entity and names a particular relation predicate. Generally, the entities in a relation will be specified in terms of variables of a specific entity type, the variables only being bound when the service model is used by the inference engine; however, specific entity instances may be directly written into a relation (such as a name constituting a particular string entity).

In defining a relation, it may be useful to specify whether or not an instance of one entity in the relation can relate to more than one instance of another entity in the same relation, this characteristic of the relation being termed its "cardinality". For example, one directory can contain many files but each file can be in only one directory and it may be useful to specify this property in any relations associating files and directories.

A straightforward model will, for example, comprise an entity corresponding to the service itself and an associated derived relation to the effect that the service entity is 'OK' (that is, functional) provided a set of conditions are met, these conditions being particular relations between entities involved in providing the service. The relations associated with these latter entities permit a determination to be made as to whether the conditions have been met for the service entity to be 'OK'.

Figure 7:
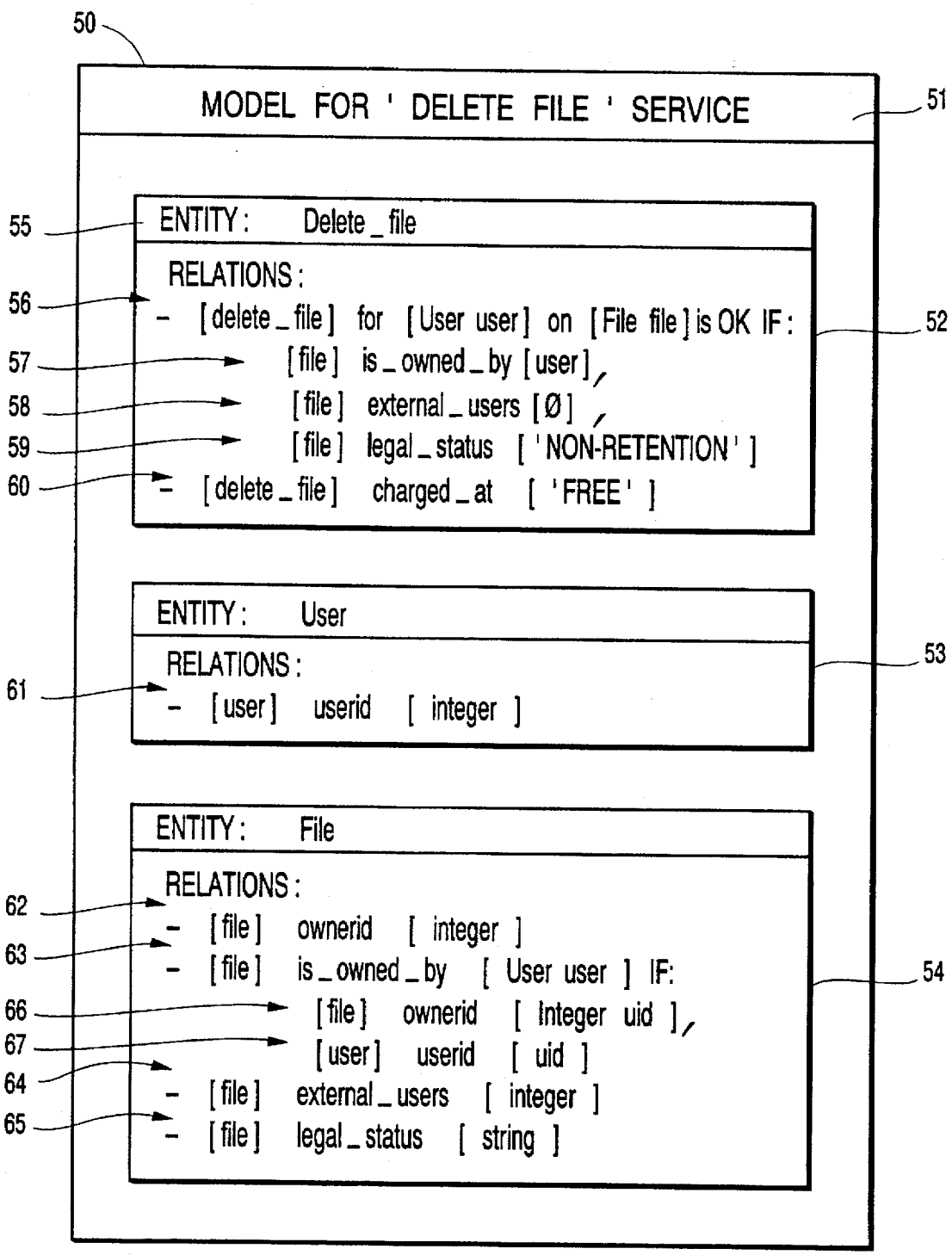
FIG. 7 is a diagram illustrating the format of a service model including the definition of three entity types with associated relations.

FIG. 7 illustrates, by way of example, a simple service model 50 for a notional service for deleting a file. This example model is considerably simplified over what might be expected in practice and is given purely to assist in demonstrating the concepts involved in service models; furthermore, the cardinalities of the relations involved have been omitted for simplicity. The convention used in this specification is that entity types are given initial capitals whilst corresponding variables start with lower case letters and have generally similar names to their entity type; in fact, the type of a variable is declared at the first occurrence of the variable except where the variable type is readily apparent. Within a relation, entities (whether represented by a variable or specified as particular instances) are enclosed in square brackets and where the value of an entity does not matter (only that it has one) the underscore symbol '_' is included in the brackets. The logical operators AND, OR and NOT are represented by ",", ";" and "~" respectively.

The FIG. 7 service model 50 comprises a header 51 identifying the model and three ER groups 52, 53, 54 defining three entity types, namely:

Delete_file—representing the service itself;

User—representing users known to the system;

File—representing files on the system.

String and integer core entities are also used.

The service entity Delete_file is declared in definition 55 of ER group 52. Associated with the definition 55 are two relations, namely:

a derived relation 56 that sets out the conditions 57 to 59 needing to be met if an instance of the service (represented by variable 'delete_file') is to be OK for a given user (represented by variable 'user') in respect of a given file (represented by variable 'file'). The variables 'user' and 'file' are of type User and File respectively and are specifically declared as such.

a basic relation 60 giving the charging rate for the service (here specified by the string 'FREE').

It will be noted that the second relation 60 is not used in determining the functional status of the service but asserts a relation that may be useful for other purposes.

The essence of relation 56 is that the file deletion service is available to a user represented by the variable 'user' in respect of a file represented by the variable 'file' if the user owns the file (condition 57), no-one else is using the file (condition 58) and the legal status of the file is explicitly 'non retention'. It will be appreciated that when the conditions are applied, the same values are bound to corresponding variables in the various conditions, these values being those already bound to the variables in the first line of the derived relation 56.

ER group 53 defines entity type User and has one basic relation 61 specifying that each user (as represented by variable 'user') has a user identity that takes the form of an integer.

ER group 54 defines entity type File and has three basic relations 62, 64, 65 and one derived relation 63. Relations 62, 64, 65 respectively attribute to a file (represented by variable 'file'), an integer for identifying the file owner, an integer for specifying the current number of users of the file other than its owner, and a string for specifying the legal retention status of the file. Relation 63 sets out the two conditions 66, 67 requiring to be met for a given file to be owned by a given user, namely that the file owner id should correspond to the user's user id. It should be noted that this correspondence is specified by use of an integer variable 'uid' that will have a value bound to it when during application of relation 63, the inference engine in seeking to prove conjunction of the statements forming the conditions 66, 67 finds a relevant fact giving the owner id of a file, and applies this to condition 66; the value of 'uid' is now bound and condition 67 can be tested.

It will be appreciated that the variables specified in the relations included in a service model will have values assigned to them either explicitly on initiation of a task (for example, by the system manager) or by reference to the fact base, or by use of the query system.

In more sophisticated models, where a number of closely related services exist such as a set of services provided by the same system object (for example, a file system manager), then rather than having a separate entity for each such service, it is convenient to define a general service entity conceptually spanning all the related services (this entity could be thought of as equating to the relevant service provider object of the system). This general service entity is then associated with each specific service through a corresponding relation (normally a derived relation setting out the conditions for the specific service concerned to be available). Thus, with reference to the foregoing example of a service for deleting a file, a general service entity type "File_service" may be defined to encompass all file-related services. The file deletion service then takes the form of a derived relation:

---

[file_service] delete_file_for [User user] on [File file] isOk IF:
[file] is_owned_by [user],
etc

---

This can be interpreted as saying that the instance of the File_service entity type represented by the variable "file_service", can provide the file deletion service for the user represented by the variable "user", in respect of the file represented by the variable "file", provided the conditions specified after "IF" are met.

Two repetition-reducing mechanisms are preferably provided to prevent undue repetition of the definition of entity types and relations that may otherwise occur in modelling any substantial service. These mechanisms are:

INHERITANCE between entity types so that one entity can inherit the relations of another, and IMPORTATION enabling one model to make reference to entities in another model.

These mechanisms will be considered further below with reference to FIG. 8.

Figure 8:
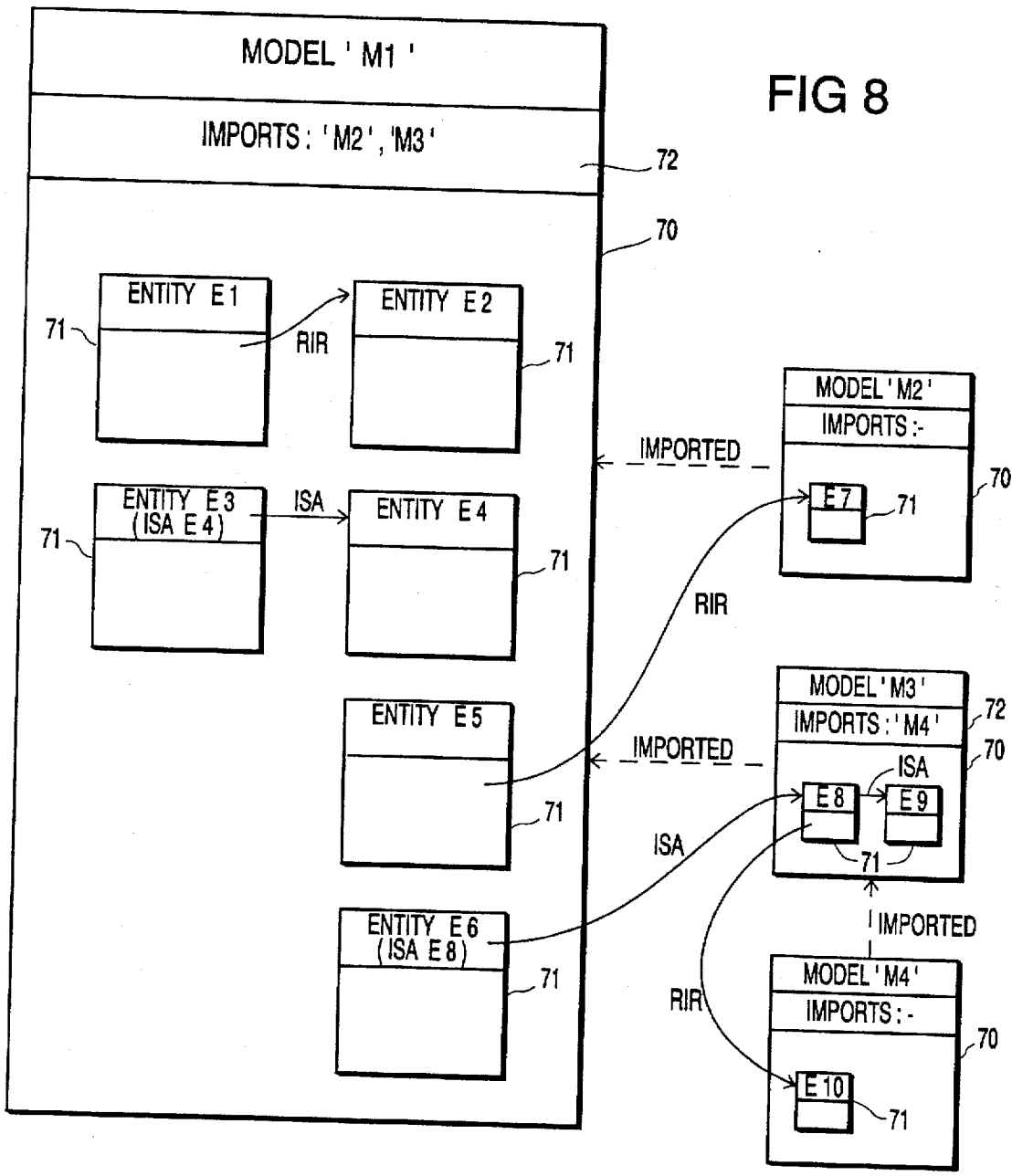
FIG. 8 is a diagram illustrating inheritance between service-model entities and importation across models.

FIG. 8 diagrammatically depicts four models 70 named M1, M2, M3, M4 respectively. Model M1 is shown as including six ER groups 71 respectively relating to entity types named E1 to E6. Model M2 is shown with one ER group 71 for an entity type named E7; model M3 is shown in two ER groups 71 for an entity type named EIP. The relations characterising each entity type are not explicitly depicted.

As already described with reference to FIG. 7 a relation in one ER group of a model may refer to an entity of a type defined in the same model. The reference to an entity of a first type from within a relation of an ER group associated with a second entity type is herein referred to as "RIR"

reference (derived from "Reference In Relation"). FIG. 8 illustrates an RIR reference from a relation of the ER group associated with entity type E1 to an entity of type E2, this reference being depicted by an arrow.

Entity types within the same model may also be related by an "ISA" reference that specifies as inheritance relationship between two entities whereby the relations associated with one entity are inherited by another. If an entity inherits relations associated with another entity, this is declared in the definition of the entity type of the former, typically by an "ISA" statement. An ISA relation is illustrated in FIG. 8 between the entity types E4 and E3 of model M1. The inheriting entity is referred to as the "sub-entity" and the entity whose relations are inherited, is called the "super-entity". Inheritance may occur over several levels, building up a hierarchy of inheritance.

In most practical systems, multiple service models will be defined and it becomes useful to be able to make RIR and ISA references that extend across model boundaries thereby to avoid duplication of the definitions of common entity types and relations. This crossing of model boundaries is enabled by the aforesaid IMPORT mechanism by which any model referred to by another is explicitly declared in the latter in a section immediately following the model name. Thus if a relation in the ER group 71 associated with entity type E5 of FIG. 8 wishes to make an RIR reference to an entity of type E7 already defined in model M2, it can do so provided the model M2 has been declared in an "import" section 72 of model M1. Similarly, entity type E6 of model M1 can use an ISA reference to inherit the relations associated with entity type E8 of model M3, provided model M3 has been declared in section 72 of model M1.

In the example of FIG. 8, entity type E8 of model M3 is not only the superentity of entity type E6 of model M1 but is also a sub-entity of entity type E9 of model M3 and, in addition makes an RIR reference to an entity of type E10 of model M4. The latter reference does, of course, require model M4 to be imported into model M3 by being appropriately declared in section 72 of model M3.

It should be noted that the 'Import' mechanism does not operate to provide inheritance between models; it is only entities that can be structured into an inheritance hierarchy.

The core entity types (integers, characters and strings) can be considered to form part of a 'support' service model which is imported into every other model enabling the use of core entities in those models. Because these entity types are so widely used, no explicit import declaration is required, this import being assumed.

A formal description will now be given for service models using a BNF-type language with the following notation:

| | |
|---|---|
| ::= | means 'is defined by'; |
| * | means there may be one or more instances of the item concerned; |
| ¦ | means OR; |
| (XYZ¦) | means item XYZ OR no item |

1. MODEL

| | | |
|---|---|---|
| Model | ::= | Modelhead (Imports ¦) (ERgroup)* |
| Modelhead | ::= | 'MODEL' inodel name |
| Imports | ::= | ('IMPORT' model name)* |
| ERgroup | ::= | Entity (Relation)* |
| Modelname | ::= | string |

2. ENTITY

| | | |
|---|---|---|
| Entity | ::= | CoreEntity ¦ ModelEntity |
| ModelEntity | ::= | 'ENTITY' entityName ('ISA' superEntityName ¦) |
| entityName | ::= | string |
| superEntityName | ::= | string |

3. RELATION

| | | |
|---|---|---|
| Relation | ::= | BasicRelation ¦ DerivedRelation |
| BasicRelation | ::= | 'BASIC' relationHead cardinality(explanation ¦) |
| relationHead | ::= | typeinfo (relationName typeinfo)* (relationName ¦) |
| typeinfo | ::= | '[' ((modelName '.' ¦) entityName ¦) variable ']' |
| cardinality | ::= | 'O' ¦ 'M' |
| explanation | ::= | 'EXPLANATION' (string ¦ typeInfo option)* |
| option | ::= | '(' (string ¦) '¦' (string ¦) ')' |

Note: the 'explanation' of a relation is used by the system when it wants to output a pseudo-natural language representation of a fact.

| | | |
|---|---|---|
| DerivedRelation | ::= | Head'IF' Body |
| Head | ::= | 'DERIVED' relationHead cardinality (explanation ¦) |
| Body | ::= | expression |
| expression | ::= | andExpression (';' andExpression)* |
| andExpression | ::= | expelement (',' expelement)* |
| expelement | ::= | (' expression ' )' ¦ '~' expelement ¦ relationHead |

Figure 9:
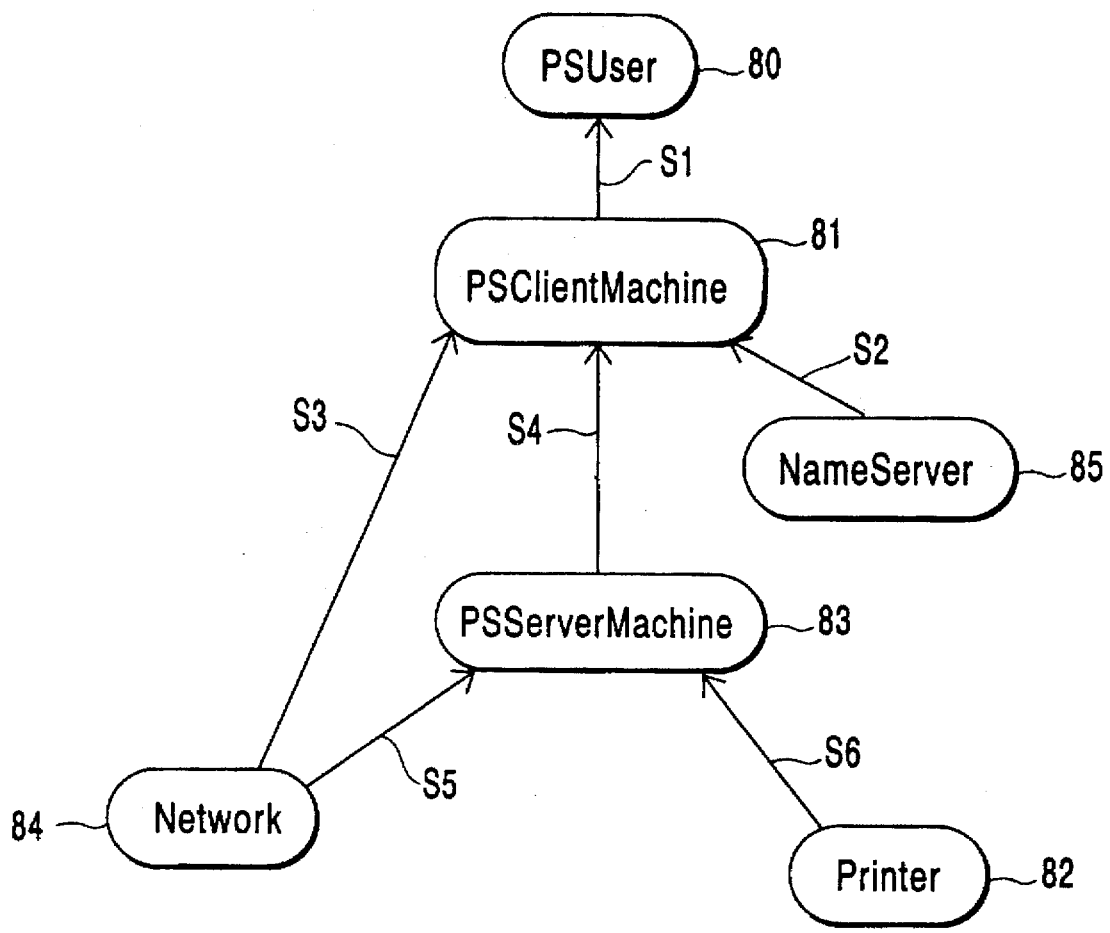
FIG. 9 is a diagram of the functions involved in providing a print spooler service to a network user.

Structuring of Models For a substantial computer system, any particular system service, such as print spooling, is best modelled as made up of a number of internal system services provided to particular system objects. The structuring of the service models in such cases will generally reflect the physical world structure of the system to a greater or lesser extent. Consider, for example, the modelling of the printer spooler service illustrated in FIG. 9 in which a user 80 (PSUser) working at a machine 81 (PSClientMachine) wishes to print file on printer 82 (Printer) using a print server 83 (PSServerMachine) coupled to the machine 81 and printer 82 via a network 84 (Network). The first step is to carry out an analysis of which object is requesting what service from which other object(s). As can be seen, the user 80 needs the "service" S1 called "canPrint[file]on [prtName]", the purpose of this service being apparent from its name. In order for the user's machine 81 to provide this service S1 to the user 80, it must have the following conditions satisfied:

1. itself is configured properly internally to provide the service;

2. it can get the service S2 "canFind[pSServer]Addr" from somewhere (to identify a print server 83—in this case, the service S2 is provided by a name server 85);

3. it can get the service S3 "hasRouteTo[pSServer]" from somewhere (to enable it to contact the named print server 83 over the network);

4. it can get the service S4 "print[file]on[prtName]from [hostName]" from somewhere.

Of the items listed above, only the last "service" is directly related to printing the file.

In order that the server machine 83 is able to provide the service 54 "print[file]on[prtName]from[hostName]" to the machine 81, it in turn must have the following conditions satisfied:

1. itself is configured properly internally to provide the service;

2. it can get the service S5 "hasRouteTo[printer]" from somewhere;

3. it can get the service S6 "print[psFile]" from somewhere.

Figure 10:
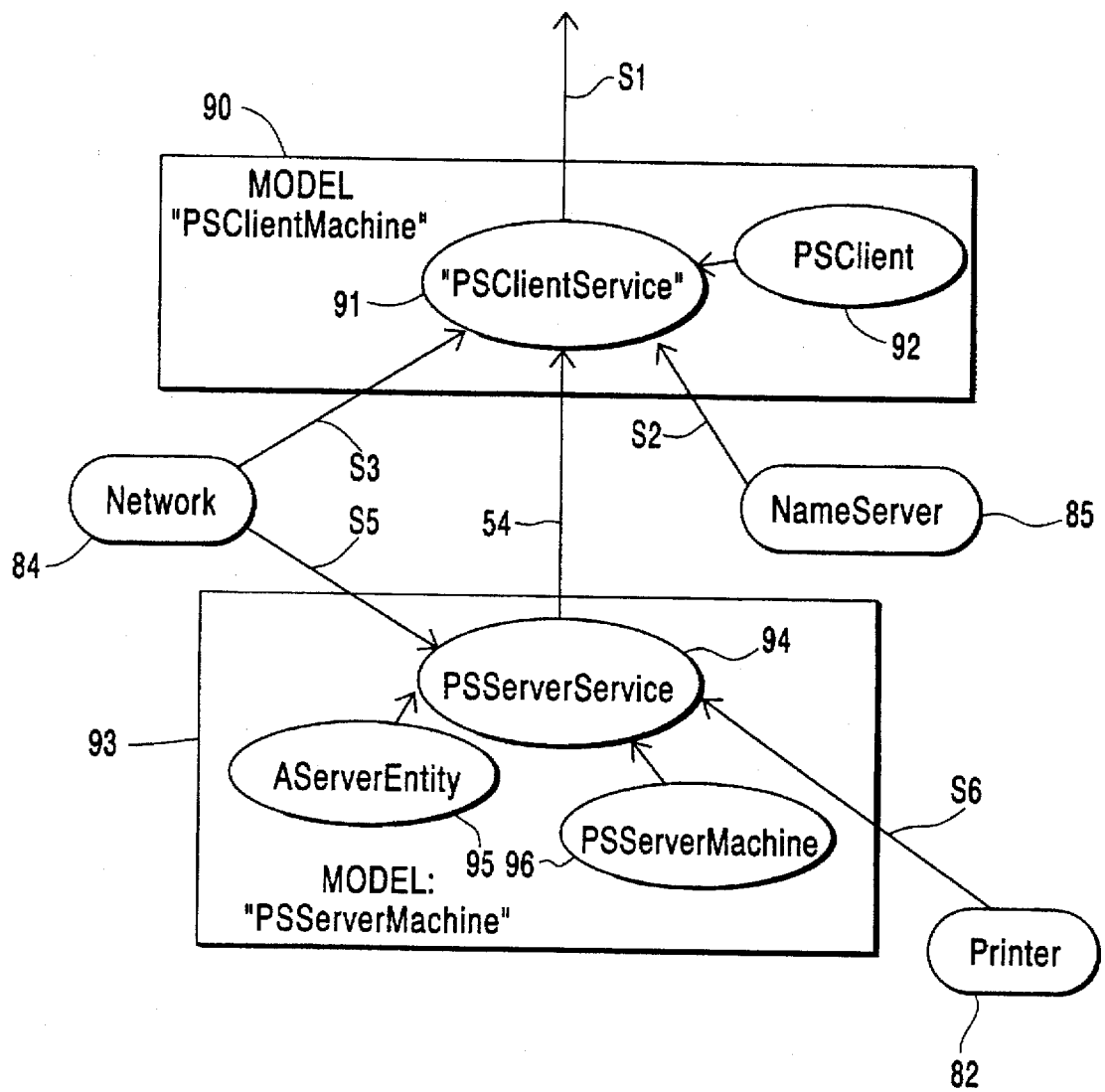
FIG. 10 is a drawing of how the FIG. 9 service can be expressed in terms of service models and entities.

FIG. 10 shows one possible model structure for the core of the printer spooler service (for convenience, details of the modelling of the network 84, nameserver 85 and printer 82 have not been shown and indeed, models for the services offered by these objects would generally have been done in advance of modelling of high level services such as the printer spooler service).

In the FIG. 10 model structure, the service S1 provided by the user's machine 81 ('PSClientMachine') has been rendered as a service model 90 (here given the same name for simplicity) that includes an entity type 91 ('PSClientService') corresponding to the service S1 itself. This service entity type 91 will typically have an associated derived relation that sets out the conditions needing to be fulfilled for the service S1 to be available, these conditions corresponding to those noted above for the user's machine 81 to provide the service S1. The service model 90 also includes an entity type 92 for the user 80 ('PSClient') as generally there will be a condition associated with the service entity 91 that depends on the user's identity.

The service S4 provided by the print server 83 ('PSServerMachine') is rendered in the FIG. 10 model structure as a service model 93 that includes an entity type 94 ('PSServerService') corresponding to the service S4 itself. This service entity type 94 will typically have an associated derived relation that sets out the conditions needing to be fulfilled for the service S4 to be available, these conditions corresponding to those noted above in relation to the server machine 83. Further entity types 95 ('A ServerEntity') and 96 ('PSServerMachine') are also defined for detailing conditions relating to configuration of the server machine 83.

Policies it should be noted that the conditions specified in service models for particular service to be available, need not all be determined by the technical requirements of the service. Conditions may be placed on the availability of a service, or more usually on the status of a related entity, that are determined by management policy whether local or company wide. Thus, there may be a local site policy that a user's home directory is called by the user's name; such a policy could be readily incorporated into a condition for logging in (i.e. a user can only log in to the computer system if there is a home directory corresponding to the user's name. Such policy conditions are preferably grouped in an ER group associated with a Policy entity that is required to be 'OK' for a given service to be available. Of course, it is not always clear whether a particular condition is a technical one or a policy one; for example, a password condition could be viewed as of either type.

QUERIES

As previously indicated, associated with each model is a set of queries for enabling information to be obtained from the system being managed. Each query is 'goodfor' one or more facts, and these facts are identified with the query to permit selection of the query appropriate for a desired fact.

A query works by interacting with the system being managed and syntactically analysing the resultant response into tokens which are then related to entities and relations. In the present embodiment, the interaction manager 27 is responsible for running the query whilst further semantic analysis of the response is carried out by the knowledge assimilator 32 which is also responsible for updating the fact base.

Three main types of interaction are possible. Firstly, a query may use existing information-providing services of the system to directly provide the required information (though generally packaged with other information and requiring syntactic extraction). Secondly, a query may exercise a particular capability of the system which although not directly supplying the required information, enables the knowledge assimilator 32 to infer certain facts from the observed results. Thirdly, it is possible to write specific agent programs running on particular machines of the system being managed, and to provide for these agents to provide specific answers to particular queries. Whilst such agents could provide powerful analysis tools, the need to add to the system being managed has practical drawbacks and this approach is therefore not preferred.

The general format of a query 100 is illustrated in simplified terms in FIG. 11. The query 100 is, of course, allotted a unique name 101. Next, the action to be performed by the managed system is specified in a command line 102 that constitutes the 'commandspec' of the query. The remaining part of the query is the 'returnSpec' describing what response can be expected to result from the action initiated by the command line 102 and how this response relates to the entities and relations of interest. The 'returnSpec' gives the general form of the response ('returnline' 103) in part of a production named RETURN that also contains a list 104 (referred to as the 'completenessPart') specifying the items for which complete information is available. The 'returnline' 103 is then syntactically specified (reference 105) to derive a number of 'returnParts' which are then related to entities and relations (reference 106). The facts for which a query is 'goodfor' are implicitly identified in section 106 of the query and typically an explicit list of these facts will be generated when the query is compiled.

Before giving a more formal description of a query, it will be useful to introduce an example query named 'passwd' used to access the Unix '/etc/passwd' file. The form of the example query is given on the following page. This query uses a command line:

cat/etc/passwd which results in the full file being returned line by line, each line relating to a different user. The format of a line is illustrated in FIG. 12 in respect of an example user 'ajp'. As can be seen, the line is made up of the following seven elements, separated by a colon,:

name—user's name on the system;
password—user's encrypted password;
uid—user's id number;
gid—user's group id number;
info—miscellaneous items of information;
homeDir—user's home directory
shell—user's shell The query 'passwd' will accordingly be 'goodfor' facts relating a user to each of the above items.

In this example, it can be seen that the 'completenessSpec' following RETURN, specifies that the query provides complete information on the following types of fact:

[User __] name [__]
[User __] encryptedPassword [__]
[User __] userId [__]
[User __] groupId [__]
[User __] initialHomeDirPath [__]
[User __] initialShellPath [__]

The syntax of each return line is given after the keyword NEW following 'line'; the syntax follows the pattern already described with reference to FIG. 13. Considering next a 'returnpart', in this case 'name', in the example the string derived for 'name' following syntactic parsing in accordance with the specification contained in 'line', is allotted to a variable <name> and then applied to the relation "[User] name[name]" to produce a fact. In a similar manner facts are produced from the return parts 'password', 'uid', 'gid', 'homeDir' and 'Shell'.

```
QUERY passwd
COMMAND ::= 'cat /etc/passwd'
RETURN ::= line {[User _] name [_] & [User_]
    encryptedPassword [_] & [User_] userId [_]
    & [User_] groupId [_]
    & [User_] initialHomeDirPath [_]
    & [User_] initialShellPath [_]}.
line ::= (NEW [user] name':' password ':' uid
    ';' gid ':' (info !) ':' homeDir ':'
    (shell !) EOL) +.
name ::= string <name> [user] name [name].
```

-continued

```
password ::= alphaNumString['*/.,'] <password>
    [user] encryptedPassword [password].
uid ::= number <uid> [user] userId [uid].
gid ::= number <gid> [user] groupId [gid].
info ::= alphNumstring['()?.,<>/~'!@#% &*-
    +={}[]'].
homeDir ::= alphaNumString['/.-_'] <path> [user]
    initialHomeDirPath [path].
shell ::= alphaNumString['/.-_'] <path> [user]
    initialShellPath [path].
```

A more formal description of a query now follows, again with explanatory reference to the foregoing example query.

A query definition is composed of the following items:

```
Query::= 'QUERY' queryName variableDeclarations
    commandSpec returnSpec delimiterSpec commentSpec
queryName is a word chosen to identify the query.
variableDeclarations is used to declare the variables whose values will passed in
at run-time for use in the commandSpec. Definition:
    variableDeclarations ::= typeInfo*
commandSpec is the specification of the command to be executed on the
(possibly) remote device/machine. Definition:
    commandSpec ::= 'COMMAND' ::= '(string | variableName) +
returnSpec defines the syntactic and semantic specification of the return value
from executing the command. As can be seen from the earlier example, this part
contains a set of BNF-type grammar productions which define the syntax of the
return string. The very first productionName must be RETURN. Definition:
    returnSpec ::= production +
    production ::= productionName '::=' returnLine
        ('+' !) '.'
returnline forms the bulk of each production and is mainly comprised of the
names of other produtions (this allowing the hierarchical decomposition of the
return string) and reserved words (which specify the type of a terminal symbol,
for example an integer). However, embedded within the productions are also
some relation heads and completeness infomnation. Definition:
    returnLine ::= (returnEnclosure | productionName |
        newObj | returnPart | 'ToEOL' | 'EOL' |
        completenessPart )*
    returnEnclosure ::= '(' returnLine ('|' returnLine)* ')'
    newObj ::- 'NEW' typeinfo
NEW causes the creation of a new entity instance every time it is encountered at
run time. Thus, in the foregoing example whenever the "line" production is
encountered while parsing an "/etc/passwd" file, an instance of the "User" entity
is created and assigned to the variable "user".
returnPart relates the tokens returned from parsing to entities and rations and
causes facts to be produced which are added to the fact base. Definition:
    returnPart ::= fixedReturn | valueReturn
    fixedReturn ::= string (newObj | relationHead !)
    valueReturn ::= reservedWord (('<' variableName '>' !)
        relationHead !)
    reservedWord ::= 'number' | 'hexNumber'
        'string' ('[' string ']' !) |
        'alphaNumString' ('[' string ']' !) |
        'fileName' | 'printableString'
The optional string in square brackets after the "string" and "alphaNumString"
reserved words allows the user to add characters to the definition of these items.
ToEOL causes the parser to skip everything from the current point to the end of
the line.
EOL tells the parser to expect an end of line at this point.
"Completeness" as already noted refers to whether, after executing a query, there
is total information about an item. For instance, the "/etc/passwd" file contains
information about all users on the system. Thus, after executing this query the
fact base will contain information about all known users. So, if the system is
asked to prove that there was a user of a particular name, and the system could not
show that there was a user of this name, then the system can infer that there is no
user of that name, since it knows it has information about all users. Definition:
    completenessPart ::= '{' relationHead ('&' rationHead) * '}'
delimiterSpec is defined as follows:
    delimiterSpec is defined as follows:
        delimiterspec ::= 'DELIMITER ::=' ('+' | '-') string
```

By default the query return string parser uses the space and tab characters to delimit tokens. However, there may be cases where the query writer wishes to change this set. The foregoing example gives an instance of this; the "info" production needs to use the space character as a valid character within an information string. The removal of space from the delimiter set causes its automatic addition to the alphaNumString definition.

commentSpec is provided to allow the query writer to specify the notation used for comments in the query return string. This allows the parser to skip these parts. Definition:
commentSpec ::='COMMENT' ::='string 'TO' string

ACTIONS

Actions that may need to be performed in order to enable a particular task to be completed, are defined for each service model in much the same way as a query but with a simpler basic format:

ACTION—action name

COMMAND—command line

PRE—pre conditions for action

POST—post-conditions (i.e. the effect of the action)

INVALIDATE—variables invalidated by action

The command line will specify a system command (for example, a Unix command for Unix Systems) together with identifiers for the items to be acted on (for example, the command line may contain a variable of declared type for specifying the machine on which the action is to be carried out). The preconditions specified in PRE are the conditions that must be true before the action can be carried out. The post-conditions specified in POST define the effect of the action; it is these post-conditions that the inference engine will search when seeking to identify the action appropriate to effecting a particular task in relation to the service model for which the action is defined. INVALIDATE identifies the variables invalidated by the action, this information being used to remove from the fact base any facts relying on the invalidated items.

TASK PROGRAM

As previously explained, the role of each task program 21 (FIG. 3) is to adapt the operation of the inference engine 25 to the task to be performed. An example diagnosis task program is given below in a pseudo natural language form for ease of understanding.

```
DIAGNOSIS TASK
WHILE no solution found DO
    Theorem Prover : search for solution;
    IF more information needed THEN
        REPEAT find a query UNTIL Verifier: prove pre-conditions END
        perform query;
        IF query passes THEN
            Knowledge Assimilator: assimilate query pass reasons
        ELSE
            Diagnosis Task: on query failure reasons
        END
    END
END
```

The above task program, which can be used in conjunction with any service model, searches for a solution to whether the service concerned (as represented by an entity of the corresponding model) is available. This search will proceed through all the conditions specified in the relations associated with the relevant service entity until either it is proved that a required condition is not met or it is proved that all conditions are met and the service is available. In conducting the search for a solution, queries may be used to ascertain facts.

Considering the diagnosis task program in more detail, the main theorem power 33 (FIG. 4) is first called upon to search for a solution. If during the course of this search, the theorem power 33 is unable to proceed because a required fact is not present in the fact base 26, then the verifier 31 is used to select a query that will elicit the desired fact from the system. The selected query is then executed (by the interaction manager 27). If the query is successfully carried out, the results from the query are assimilated into the fact base by the knowledge assimilator 21 and the program then loops for the theorem prover 33 to continue its search using the newly established facts. However, if the query fails (that is, is not successfully executed), then the diagnosis task is recursively called to establish the reason for this failure.

If there is a problem with a service being diagnosed, the above diagnosis task program will terminate when the theorem prover 33 first comes across a fact proving that a requirement for the service to be available, has not been met. Because the facts assimilated into the fact base are generally low level facts, the termination of the program at this stage will normally be acceptable as the termination point will indicate the low-level fact resulting in service non-availability and this fact will generally be readily translatable into the computer system fault (including absence of a resource) concerned. However, where the fact base stores high-level facts, it is desirable that the diagnosis task program does not terminate at a high-level fact proving service non-availability, but continues to decompose this fact to derive the underlying cause as expressed in a low-level fact. This can be readily achieved by enclosing the above diagnosis task program within a 'WHILE' loop of the form:

WHILE failure explanation possible DO

Diagnosis Task

END

In this case, whenever the core diagnosis task terminates on finding a fact proving service non-availability, it is asked to find a solution proving that fact (and ignoring its presence in the fact base). This process repeats until no further explanation is possible (as indicated by the absence of any relevant query).

If, in fact, the above additional WHILE loop is not limited to failure explanation, but is used to explain any solution, then the expanded diagnosis task can also be used to provide a full check on all conditions (high-level and low-level) required for a particular service.

By tracking the search and using the pseudo natural language fact representations contained in the 'explanation' element of each relation, it is possible to output a listing of the 'reasoning' followed by the theorem prover 33 in finding a solution.

A further example of a task program is given below in relation to a monitoring task:

MONITORING TASK

WHILE Diagnosis Task: proves monitored goal true DO delay for monitoring interval

END;

Diagnosis Task: on whole Service

As can be seen, the monitoring task uses the diagnosis task in its implementation.

EXAMPLE

Having explained in some detail the concepts of the present invention and how they may be implemented in one embodiment, a concluding and somewhat fuller example of a service model will now be given. The example chosen is that of the login service provided by a Unix workstation (Unix is a trademark of AT&T).

Because of the desirability of re-using entities defined in other models, as well as the login service model Login, part of a model Unix modelling the operating system is also given.

The Unix model provides the basic entities relevant when dealing with the Unix operating system. Here only those entities and relations from the Unix model which are useful to understand the parts of the login model are discussed below.

```
MODEL Unix
ENTITY User
BASIC
    [user] initialHomeDirPath [pathname].
    [user] name [userName].
    [user] UserId [integer].
    [user] initialShellPath [pathname].
    [user] groupId [integer].
    [user] encryptedPassword [string].
DERIVED
    [user] hasReadWriteAccessTo [pathname] IF
        [File file] pathname [pathname],
        [user] has ['read'] accessTo [file],
        [user] has ['write'] accessTo [file].
    [user] has [FileMode mode] accessTo [file] IF
        ([file] isOwnedBy [user],
        [file] ownerMode[mode]);
        (~ [file] isOwnedBy [user],
        [file] isInGroupOf [user],
        [file] groupMode [mode]);
        (~ [file] isOwnedBy [user],
        ~ [file] isInGroupOf [user],
        [file] worldMode [mode]);
    [user] isSuperUser.
ENTITY File
BASIC
    [file] setGroupId.
    [file] ownerMode [fileMode].
    [file] stickyBit.
    [file] name [fileName].
    [file] size [integer].
    [file] worldMode [fileMode].
    [file] ownerId [userIdentifier].
    [file] date [string].
    [file] linksCount [integer].
    [file] groupMode [fileMode].
    [file] groupId [groupIdentifier].
    [file] setUserId.
DERIVED
    [file] isOwnedBy [user] IF
        [file] ownerId [integer],
        [user] userId [integer].
```

Of course, as well as these entities and relations in the Unix model, there are also queries one example of which (Query: 'passwd') has been given earlier.

The login service model now follows:

```
MODEL LoginService
IMPORT Unix
ENTITY Login
    [login] for [userName] isOk (M:O) IF
        [User user] name [userName],
        [user] encryptedPassword [String__],
        [user] userId [UserIdentifier__],
        [user] groupId [GroupIdentifier__]
        [user] initialHomeDirIsOk,
        [user] initialShellIsOk,
```

-continued

```
        [login] executableFor [user] isOk,
        [login] auditFilesAreOk.
```

The foregoing derived relation for the Login entity can be read:

login for a username is ok if
there is a user with that username, and
the user has a password (its value does not matter), and
the user has a user ID (its value does not matter), and
the user has a group ID (its value does not matter), and
the user's home directory is ok, and
the user's shell is ok, and
the login executable files are ok for the user, and
the login audit files are ok.

"name", "encryptedPassword", "UserId" and "groupId" are all basic relations of the User entity (their real world values are obtained using the query 'passwd' described above). The other relations are derived ones. Here is the definition of one of them.

[login] auditFilesAreOk (M) IF
[User root] isSuperUser,
[root]hasReadWriteAccessTo[Pathname '/etc/utmp'],
[root]hasReadWriteAccessTo[Pathname '/etc/btmp'],
[root]hasReadWriteAccessTo[Pathname '/etc/wtmp'],
[root]hasReadWriteAccessTo[Pathname '/etc/logingroup'],
[login]secureTtyFileIsOk,
[login]dialFilesAreOk.

And here is the definition of one of the derived relations referenced by this:

[login]secureTtyFileIsOk(M)IF
~[File __] pathname [Pathname '/etc/securetty'];
([File __] pathname [Pathname '/etc/securetty'],
[User root] isSuperUser,
[root] hasReadAccessTo [Pathname '/etc/securetty']).
This relation might translate as:
The login secure tty file is ok if there is not a file/etc/securetty, or (there is a file/etc/securetty, and
there is a super user, and
the super user has read access to/etc/securetty).

Service Verification—The following is the output from the system management apparatus on proving, by means of the expanded diagnosis task described above, that login for the user with the name 'sijt' is 'OK'. Only the reasons for parts of the models detailed previously are expanded below.

```
[login] for ('sijt']isOk is true
    because [User25'] name ['sijt'] is true
        because it is proved by a query
    because ['User25'] encryptedPassword ['rX2vsS9A3qk1'] is true
    because ['User25'] userId [327] is true
    because ['User25'] groupId [15] is true
    because ['User25']initialShellIsOk is true
    because [login] executableFor ['User25']isOk is true
    because ['User25']initialHomeDirIsOk is true
    because [login]auditFilesAreOk is true
        because ['User162'] hasReadwriteAccessTo ['(etc/utmp'] is true
            because ['File397'] endPathname ['/etc/utmp'] is true
            because ['File397'] pathname ['/etc/utmp'] is true
                because ['/etc/utmp']dirName['/etc']baseName['utmp'] is true
                    because it is proved by a metbod
```

-continued

```
because [Dir392'] pathname ['/etc'] is true
  because ['/etc']dirName['/']baseName['etc'] is true
    because it is proved by a method
  because ['Dir80'] pathname ['/'] is true
    because ['/'] equals ['/'] is true
      because it is proved by a method
    because ['Dir80']is Root is true
      because ['Dir80'] name ['/'] is true
        because it is proved by a query
      because ['Dir80'] contains ['Dir80'] is true
        because it is proved by a query
  because ['Dir80'] contains ['Dir392'] is true
    because it is proved by a query
  because ['Dir392'] name ['etc'] is true
    because it is proved by a query
because ['File397'] name ['utmp'] is true
  because it is proved by a query
because ['Dir392'] contains ['File397'] is true
  because it is proved by a query
because ['User162']has['write']accessTo[File397'] is true
  because ['File397'] ownerMode ['write'] is true
    because it is proved by a query
  because ['File397']isOwnedBy ['User162'] is true
    because ['File397'] ownerId [0] is true
      because it is proved by a query
    because ['User162'] userId [0] is true
      because it is proved by a query
because ['User162'] has ['read'] accessTo ['File397'] is true
  because ['File397'] ownerMode ['read'] is true
    because it is proved by a query
  because ['File397'] isOwnedBy ['User162'] is true
    because ['File397'] ownerId [0] is true
      because it is proved by a query
    because ['User162'] userId [0] is true
      because it is proved by a query
because ['User162']isSuperUser is true
  because ['User162'] userId [0] is true
    because it is proved by a query
```

In the foregoing, reference to a fact being proved by a 'method' simply means that low-level code has been used to test a particular relation rather than using the fact base and query mechanism. Typically, it is convenient to carry out tests in this manner for relations between core entities (number comparison, string matches, etc).

VARIANTS

It will be appreciated that many variants are possible on the above-described embodiment of the invention. Thus, for example, although each task has been described as being subject of a respective task program, it would be possible to provide other task-determined means, besides a program, for controlling the processing of the service models. These other means might include a respective dedicated inference engine for each task or respective hardware means for controlling a common general purpose processor to perform each task.

At a more detailed level, specific measures may be taken to ensure as far as reasonably possible, the validity of any facts held in the fact base. For example, each query could be allocated a 'lifetime' being the time for which any facts derived by running the query can be considered valid. At the expiration of the query lifetime, all derivative facts (and any further facts based on them) are deleted from the fact base. With such an arrangement, monitoring of system elements can be implemented by using queries to derive facts on those elements, with these queries having a lifetime corresponding to the monitoring interval; upon such a query reaching the end of its life, the facts of interest will be removed from the fact base and this can be used by the monitoring task as a trigger for reinitiating the corresponding query.

Furthermore, whilst each service model has associated queries and actions (where appropriate), these queries and actions may be shared by two or more models. For example, a query relating to whether a file exists could well be one used by several different service models and it is clearly more efficient to share the query between models than to specify the query for each model.

It will be appreciated that any suitable user interface can be provided for the system management apparatus; in particular, a graphical user interface may be used in which 'drag and drop' actions can serve to implement tasks in relation to particular instances of different service models.

We claim:

1. A system management method of carrying out at least one management task in relation to at least one service intended to be provided by a computer system including cooperating physical and logical entities, said method comprising the steps of:

providing for the or each said at least one service, a respective declarative model specifying independently of any particular said task, requirements needing to be met for the service to be available, these requirements being set out in terms of the entities required and the inter-relationships of the required entities, providing for the or each said at least one management task, respective task control means for controlling performance of the corresponding task in a manner independent of any particular said model and in terms of general inferencing operations that can be performed on any said model, and performing a said at least one management task in relation to a said at least one service by a process, activating the process so inferencing operations are performed on the corresponding declarative model under the control of the said task control means relevant to that management task.

2. A system management method according to claim 1, wherein each said task control means comprises a respective task program for controlling the operation of an inference engine used to perform said at least one management task.

3. A system management method according to claim 1, wherein each said task control means is embodied, at least in part, in a respective inference engine used to perform the corresponding task.

4. A system management method according to claim 1, wherein said computer system provides multiple services in respect of which multiple tasks are to be effected, said method involving providing a respective said service model for each said multiple service and a respective said task control means for each said multiple task.

5. A system management method according to claim 1, wherein said computer system is capable of supporting a plurality of instantiations of a said service, the said step of carrying out a said at least one management task in relation to a said at least one service, involving identifying a said instantiation of the service for which the task is to be carried out and then using the appropriate service model to inference information in relation to the identified service instantiation.

6. A system management method according to claim 1, wherein at least one said declarative model comprises a hierarchical structure of declarative statements inter-relating entities, statements lower in the hierarchy serving to detail requirements specified by statements higher in said hierarchy.

7. A system management method according to claim 6, wherein said at least one model includes, in addition to said statements specifying requirement statements generally inter-relating said entities and usable to infer whether a particular said requirement has been met.

8. A system management method according to claim 6, wherein a plurality of said service models are provided each specifying a respective said service, at least two said models being associated such that statements set out in one said model and involving a particular said entity are usable in another model that also refers to that entity.

9. A system management method according to claim 1, wherein said requirements comprise both a set of essential technical requirements and a further set of operational policy requirements, these sets being specified separately from each other.

10. A system management method according to claim 1, wherein said step of carrying out a said at least one management task involves interacting with said system to ascertain either directly or through inferencing from the results of the interaction, whether a said requirement relevant to the service concerned is met by the system.

11. A system management method according to claim 1, wherein said method further comprises the step of providing a fact base holding facts on the status of the system, said step of carrying out a said at least one management task involving referring to said fact base to ascertain whether a said requirement relevant to the service concerned can be performed by the system in the status it has.

12. A system management method according to claim 1, wherein said method further comprises the step of providing a fact base holding facts on the status of the system, said step of carrying out a said at least one management task including ascertaining whether a said requirement relevant to the service concerned is met by the system by referring to said fact base for facts relevant to said requirement, and in the event that insufficient facts about the status of the system are present in the fact base to ascertain whether said requirement is met, interacting with the system to ascertain either directly or through inferencing from the results of this interaction the further needed facts about the status of the system.

13. A system management method according to claim 12, wherein the results derived from interacting with the system are stored in said fact base.

14. A system management method according to claim 1, wherein said management task being carried out is a fault diagnosis task.

15. A system management method according to claim 1 wherein said step of carrying out a said management task involves changing said system to meet a said requirement of the service concerned, the changing step being performed by adding or removing an entity or by modifying the interrelationship between at least two said entities.

16. A system management method according to claim 15, wherein said management task being carried out is an installation of said service.

17. A system management method according to claim 1 wherein said computer system comprises a network of computers.

18. System management apparatus for carrying out at least one management task in relation to at least one service intended to be provided by a computer system including cooperating physical and logical entities, said apparatus comprising:

a declarative model specifying independently of any particular said task, the requirements needing to be met for the service to be available, these requirements being set out in terms of the entities required and the interrelationships of the required entities, one of said declarative models being provided for the or each said at least one service, inference engine means for carrying out inferencing operations in relation to a said declarative model, task control means, one of said task control means being respectively provided for the or each said at least one management task, each task control means being arranged for controlling performance of the corresponding task by said inference engine means in a manner independent of any particular said model and in terms of general inferencing operations, and means for causing a said at least one management task to be carried out in relation to a said at least one service, said means for causing being arranged for causing said inference engine means to operate on the corresponding declarative model under the control of the said task control means relevant to that management task.

19. System management apparatus according to claim 18, said apparatus further comprising fact base means storing facts about the status of said system, and interaction means for interacting with said system to ascertain either directly or through inferencing from the results of the interaction, facts about the status of the system, said inference engine means being operative in the course of carrying out a said management task for (a) checking whether a said requirement is being met by said system by referring to said fact base means and (b) causing said interaction means to interact with the system to elicit further facts in the event that insufficient facts about the status of the system are present in the fact base means.

* * * * *